United States Patent
Yamada et al.

(10) Patent No.: US 8,556,222 B2
(45) Date of Patent: Oct. 15, 2013

(54) SEAT SLIDE DEVICE FOR VEHICLE (75) Inventors: Yukifumi Yamada, Toyota (JP); Shinya Isobe, Nagoya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/501,479

(22) PCT Filed: Sep. 14, 2010

(86) PCT No.: PCT/JP2010/065786
§ 371 (c)(1),
(2), (4) Date: Apr. 12, 2012

(87) PCT Pub. No.: WO2011/055591
PCT Pub. Date: May 12, 2011

(65) Prior Publication Data
US 2012/0199719 A1   Aug. 9, 2012

(30) Foreign Application Priority Data

Nov. 5, 2009   (JP) .................................. 2009-253635

(51) Int. Cl.
*F16M 13/00* (2006.01)
(52) U.S. Cl.
USPC .......................... 248/430; 248/429; 296/65.14
(58) Field of Classification Search
USPC .................. 248/424, 429, 430; 297/311, 318; 296/65.01, 65.11, 65.13, 65.14
See application file for complete search history.

(56) References Cited

U.S. PATENT DOCUMENTS

| 4,701,058 | A |   | 10/1987 | Mottate |
| 5,676,341 | A | * | 10/1997 | Tarusawa et al. ............. 248/430 |
| 5,938,164 | A | * | 8/1999 | Kargol et al. ................. 248/429 |
| 6,161,892 | A | * | 12/2000 | Chabanne et al. ......... 296/65.03 |
| 6,315,352 | B1 |   | 11/2001 | Nomura |

(Continued)

FOREIGN PATENT DOCUMENTS

| JP | 2003 118442 | 4/2003 |
| JP | 2009 90771 | 4/2009 |
| JP | 2009 101955 | 5/2009 |
| WO | 2010 024210 | 3/2010 |

OTHER PUBLICATIONS

Extended European Search Report issued Mar. 15, 2013, in European Patent Application No. 10828151.0.

(Continued)

*Primary Examiner* — Alfred J Wujciak
(74) *Attorney, Agent, or Firm* — Oblon, Spivak, McClelland, Maier & Neustadt, L.L.P.

(57) ABSTRACT

A plurality of rolling members, which are retained by retainers between sidewall-portion inside operating surfaces formed on inside surfaces of sidewall portions of a lower rail and sidewall-portion outside operating surfaces formed on outside surfaces of sidewall portions of a first upper rail, roll in contact on the sidewall-portion inside operating surfaces and the sidewall-portion outside operating surfaces. Sidewall portions of a second upper rail are cut and raised at parts of only a predetermined length in a vehicle front-rear direction to be formed as rolling-element rolling portions having sidewall-portion outside operating surfaces. Rolling element circulation units each incorporating a plurality of rolling elements are fitted on the rolling-element rolling portions, so that the plurality of rolling elements roll and circulate in contact with the sidewall-portion inside operating surfaces and the sidewall-portion outside operating surfaces of rolling-element rolling portions.

2 Claims, 6 Drawing Sheets

(56) References Cited

U.S. PATENT DOCUMENTS

| | | | |
|---|---|---|---|
| 6,926,443 B2* | 8/2005 | Niimi et al. | 384/34 |
| 7,506,856 B2* | 3/2009 | Ikegaya et al. | 248/430 |
| 7,637,469 B2* | 12/2009 | Yamada et al. | 248/430 |
| 7,758,008 B2* | 7/2010 | Kojima et al. | 248/430 |
| 8,061,756 B2* | 11/2011 | Kimata et al. | 296/65.17 |
| 8,091,851 B2* | 1/2012 | Yamada et al. | 248/430 |
| 2005/0103968 A1* | 5/2005 | Yamada et al. | 248/429 |
| 2007/0069099 A1* | 3/2007 | Kohmura | 248/430 |
| 2007/0090263 A1* | 4/2007 | Yamada et al. | 248/429 |
| 2007/0176072 A1* | 8/2007 | Ikegaya et al. | 248/429 |
| 2008/0048086 A1* | 2/2008 | Kojima et al. | 248/429 |
| 2008/0048087 A1* | 2/2008 | Kojima et al. | 248/430 |
| 2009/0114793 A1* | 5/2009 | Brewer et al. | 248/429 |
| 2010/0181460 A1* | 7/2010 | Park et al. | 248/429 |
| 2010/0320353 A1* | 12/2010 | Kojima et al. | 248/430 |
| 2011/0089306 A1* | 4/2011 | Yamada et al. | 248/430 |
| 2012/0032060 A1* | 2/2012 | Suzuki et al. | 248/430 |
| 2012/0074288 A1* | 3/2012 | Yamada et al. | 248/430 |
| 2012/0074289 A1* | 3/2012 | Kimura et al. | 248/430 |

OTHER PUBLICATIONS

International Search Report Issued Oct. 12, 2010 in PCT/JP10/65786 Filed Sep. 14, 2010.

* cited by examiner

SEAT SLIDE DEVICE FOR VEHICLE

TECHNOLOGICAL FIELD

The present invention relates to a seat slide device for a vehicle.

BACKGROUND ART

Recently, in a one-box vehicle provided with a third seat in particular, in order to comply with a requirement for various seat arrangements, it is a remarkable trend to elongate the slide amount of a second seat (rear seat) in the vehicle front-rear direction. In order to cope with this, a technology has been disclosed that aims at elongating lower rails fixed to a vehicle floor and enabling rollers attached to upper rails to roll in the lower rails so that the seat slide amount can be elongated without being restrained in the slide amount by other respects than the length of the lower rails (refer to Patent Document 1).

PRIOR ART DOCUMENT

Patent Document

Patent Document 1: JP2003-118442 A

SUMMARY OF THE INVENTION

Problem to be Solved by the Invention

However, in the seat slide device described in Patent Document 1, the cost increases because the construction of the upper rails is complicated and because the parts are large in number, and in addition thereto, if an attempt is made for cost reduction to make seat slide devices for first seats (driver's seat and passenger's seat next to) common to those for the second seats, it results to provide and apply the seat slide devices for the second seats being excess in specifications to the first seats which suffice to be short in slide amount by nature, and after all, a problem arises in that the slide devices for the first seats cannot be reduced in cost.

Thus, it is also considered to use, as a seat slide device for a first seat, a seat slide device which is of the type (rolling ball type) that balls are retained by retainers and are arranged to roll between lower and upper rails, as shown in, for instance, JP2009-101955 A, and which is low in cost and short in slide amount. However, the section shape of the lower rails along which the rollers in Patent Document 1 roll differs completely from the section shape of the lower rails of the rolling ball type. Thus, it involves technological difficulties to use one lower rail as common to the lower rail of the seat slide device for the first seat as well as to that of second and third seats. As a result, there arises a problem that two kinds of lower rails are required, thereby being unable to reduce the cost.

With the aforementioned problems taken into consideration, the problem of the present invention is to provide a seat slide device for a vehicle which aims at reducing the cost of a seat slide device for a seat arranged on the front side of the vehicle and sufficing to be short in slide amount and whose lower rail is shared by a seat slide device for a seat arranged on the rear side of the vehicle and needing a long slide amount.

Measures for Solving the Problem

In order to solve the aforementioned problem, the present invention resides in comprising a lower rail extending in a vehicle front-rear direction and adapted to be fixed to a floor of a vehicle; a first upper rail adapted to have a seat of the vehicle fixed thereto and assembled to the lower rail movably in the vehicle front-rear direction; a second upper rail positioned behind the first upper rail, adapted to have a seat of the vehicle fixed thereto, and assembled to the lower rail movably in the vehicle front-rear direction; rolling members that relatively move relative to the first upper rail and the lower rail with movement of the first upper rail when a plurality of rolling elements, which are rotatably retained by retainers between sidewall-portion inside operating surfaces formed on inside surfaces of sidewall portions extending in a vehicle vertical direction of the lower rail and sidewall-portion outside operating surfaces formed on outside surfaces of sidewall portions extending in the vehicle vertical direction of the first upper rail, roll in contact on the sidewall-portion inside operating surfaces and the sidewall-portion outside operating surfaces; and rolling element circulation units that are attached to rolling-element rolling portions having sidewall-portion outside operating surfaces which are configured by cutting and raising sidewall portions extending in the vehicle vertical direction of the second upper rail at parts of only a predetermined length in the vehicle front-rear direction, and that incorporate a plurality of rolling elements which roll and circulate in contact with the sidewall-portion inside operating surfaces and the sidewall-portion outside operating surfaces of the rolling-element rolling portions and through reverse sidewalls of the sidewall-portion outside operating surfaces of the rolling-element rolling portions.

FORM FOR PRACTICING THE INVENTION

Hereafter, a seat slide device for a vehicle in an embodiment according to the present invention will be described with reference to the drawings.

Figure 1:
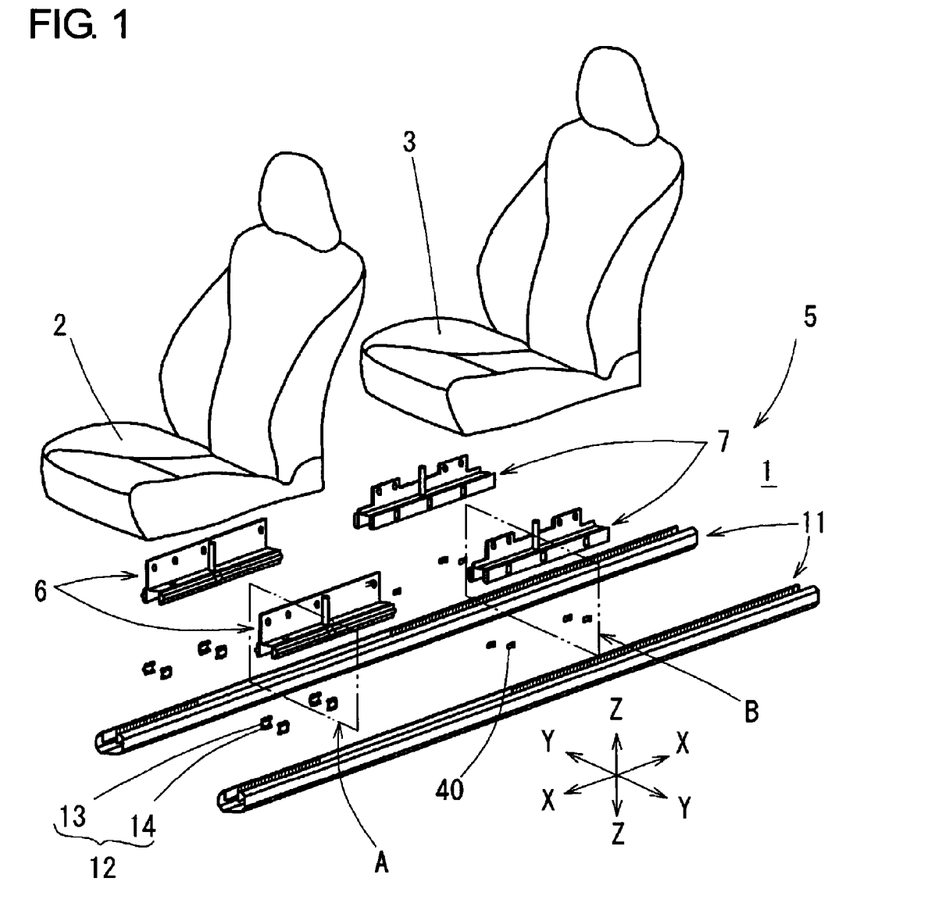
FIG. 1 is a perspective view showing vehicle seats to which a vehicle seat slide device in an embodiment according to the present invention is applied.

As shown in FIG. 1, this seat slide device 5 is provided with a pair of left and right lower rails 11 fixed on an upper surface of a vehicle floor 1 to extend in a vehicle front-rear direction, a pair of left and right first upper rails 6 fixed on a lower surface of a front seat (first seat 2) arranged on a front side of the vehicle and respectively attached slidably relative to the respective lower rails 11, and a pair of left and right second upper rails 7 fixed on a lower surface of a rear seat (second seat 3) and respectively attached slidably relative to the respective lower rails 11. The first upper rails 6 and the second upper rails 7 are movable predetermined amounts in the vehicle front-rear direction shown in FIG. 1 through sliding movements relative to the lower rails 11.

Figure 2:
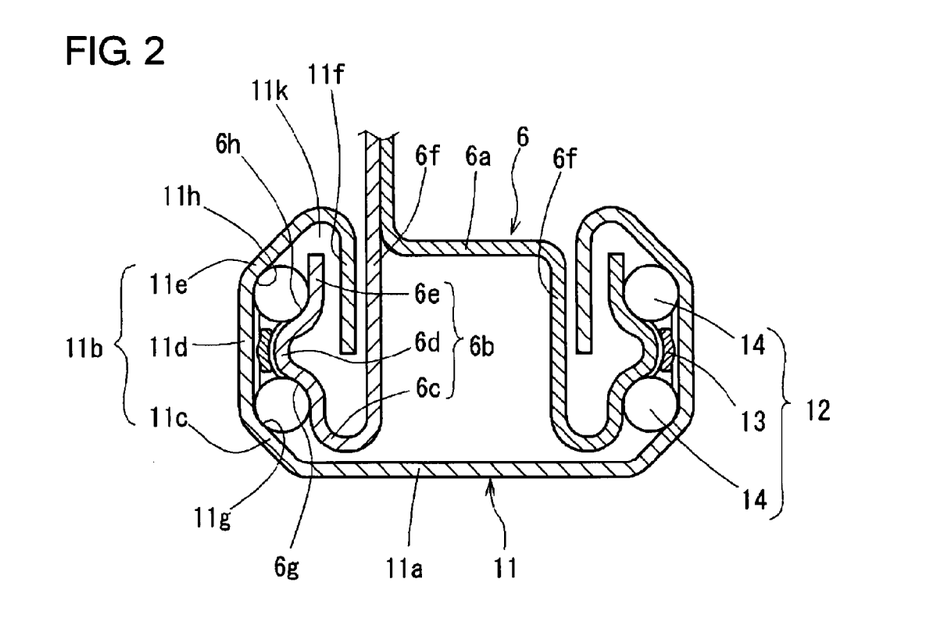
FIG. 2 is a sectional view taken along A-surface in FIG. 1 and a sectional view showing a lower rail, a first upper rail, steel balls and retainers.
Figure 5:
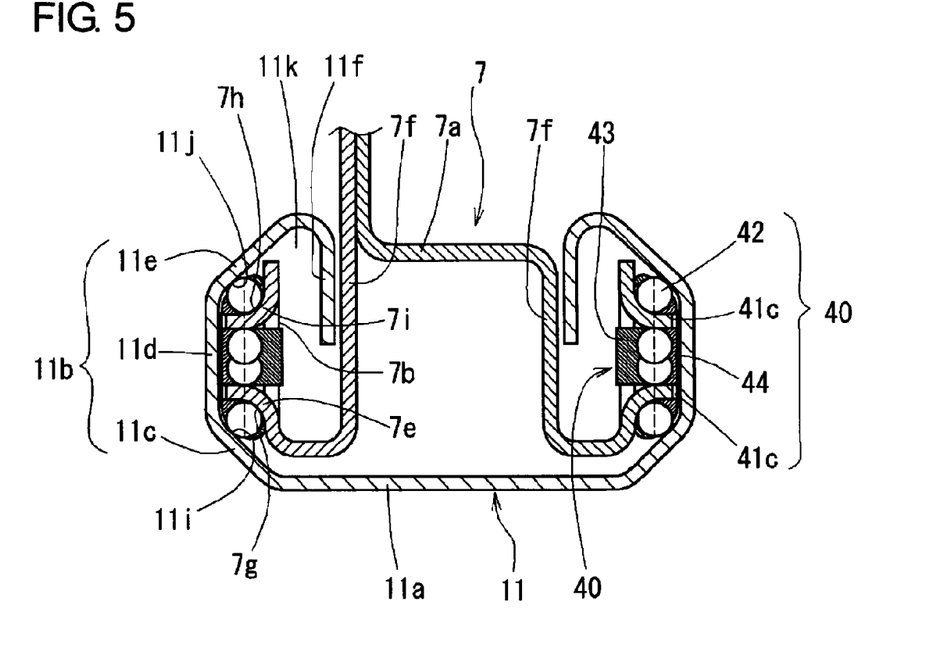
FIG. 5 is a sectional view taken along B-surface in FIG. 1 and a sectional view showing the lower rail, the second upper rail and the rolling element circulation units.

The lower rail 11 is constructed by bending a piece of plate material. The lower rail 11 extends long in the vehicle front-rear direction X, and, as shown in FIGS. 2 and 5, has a flat base portion 11a and a pair of left and right sidewall portions 11b turned upward from the both ends of the base portion 11a, so that as a whole, the cross-section is formed to an almost U-letter shape being left-right symmetrical with respect to a center axis Z extending in a vehicle vertical direction.

Each sidewall portion 11b comprises a slope portion 11c extending continuously from the base portion 11a toward the outside of the lower rail 11 and obliquely upward of the vehicle, a vertical wall portion 11d extending continuously from the slope portion 11c in the vertical direction of the vehicle, and a slope portion 11e extending continuously from the vertical wall portion 11d toward the inside of the lower rail 11 and obliquely upward of the vehicle.

A flange portion 11f is provided which extends continuously from the slope portion 11e of the sidewall portion 11b and which is bent toward the inside of the lower rail 11 and downward of the vehicle.

The vertical wall portion 11d of the sidewall portion 11b and the flange portion 11f are formed almost in parallel relation, between which a channel portion 11k is provided.

The slope portion 11c and the vertical wall portions 11d are connected in the form of an arc, and the arc shape portion serves as a first rolling portion 11g (sidewall-portion inside operating surface) on which rolling members 14 referred to later roll. Further, the vertical wall portion 11d and the slope portion 11e are connected in the form of an arc, and the arc shape portion serves as a second rolling portion 11h (sidewall-portion inside operating surface) on which the rolling members 14 referred to later roll.

As shown in FIG. 2, the first upper rail 6 is formed by bending and connecting two pieces of plate materials by welding or the like. The first upper rail 6 extends long in the front-rear direction X of the vehicle, has a flat base portion 6a and a pair of left and right vertical wall portions 6f which are provided at both ends of the base portion 6a to extend downward, and takes an almost inverted U-letter shape in the cross-section of the base portion 6a and a portion below the same.

The respective vertical wall portions 6f are bent outward at lower ends thereof and are turned upward from outside ends thereof, so that a pair of left and right sidewall portions 6b swelling outward are formed.

Each sidewall portion 6b comprises a vertical wall portion 6c extending continuously from the vertical wall portion 6f in the vertical direction of the vehicle, a connection portion 6d extending continuously from the vertical wall portion 6c toward the outside of the first upper rail 6 in the form of an arc, and a vertical wall portion 6e extending continuously from the connection portion 6d in the vertical direction of the vehicle.

The vertical wall portion 6c and the connection portion 6d are connected in the form of an arc, and the arc shape portion serves as a first rolling portion 6g (sidewall-portion outside operating surface) on which the rolling members 14 referred to later roll. Further, the connection portion 6d and the vertical wall portion 6e are connected in the form of an arc, and the arc shape portion serves as a second rolling portion 6h (sidewall-portion outside operating surface) on which the rolling members 14 referred to later roll.

Figure 3:
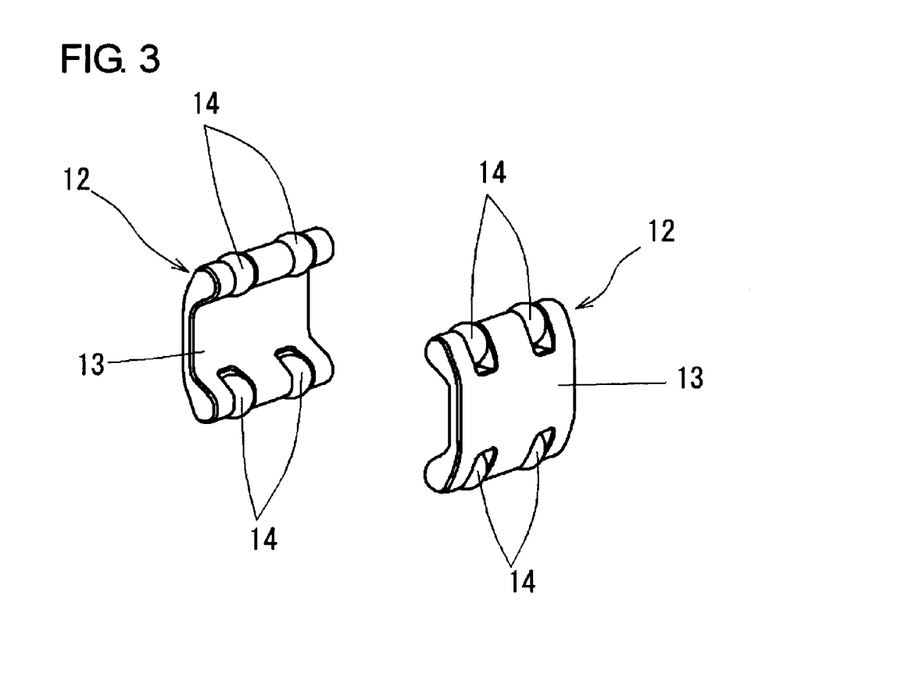
FIG. 3 is a perspective view showing the steel balls and the retainers.

As shown in FIG. 2, upper ends of the respective sidewall portions 6b of the first upper rail 6 are combined into the respective channel portions 11k of the lower rail 11. A plurality (herein, four between each lower rail 11 and the first upper rail 6) of rolling members 12 are arranged between the lower rail 11 and the first upper rail 6. As also shown in FIG. 3, the rolling member 12 is provided with a retainer 13 and a plurality (herein, four) of steel balls 14 (rolling elements) rotatably retained by the retainer 13. Further, the respective steel balls 14 are arranged between the first rolling portion 11g of the lower rail 11 and the first rolling portion 6g of the first upper rail 6 and between the second rolling portion 11h of the lower rail 11 and the second rolling portion 6h of the first upper rail 6 to roll as they slide. Consequently, when the first upper rail 6 slides relative to the lower rail 11 in the front-rear direction X of the vehicle, the respective steel balls 14 are rolled, whereby the first upper rail 6 smoothly slides relative to the lower rail 11 in the front-rear direction X of the vehicle.

Figure 4:
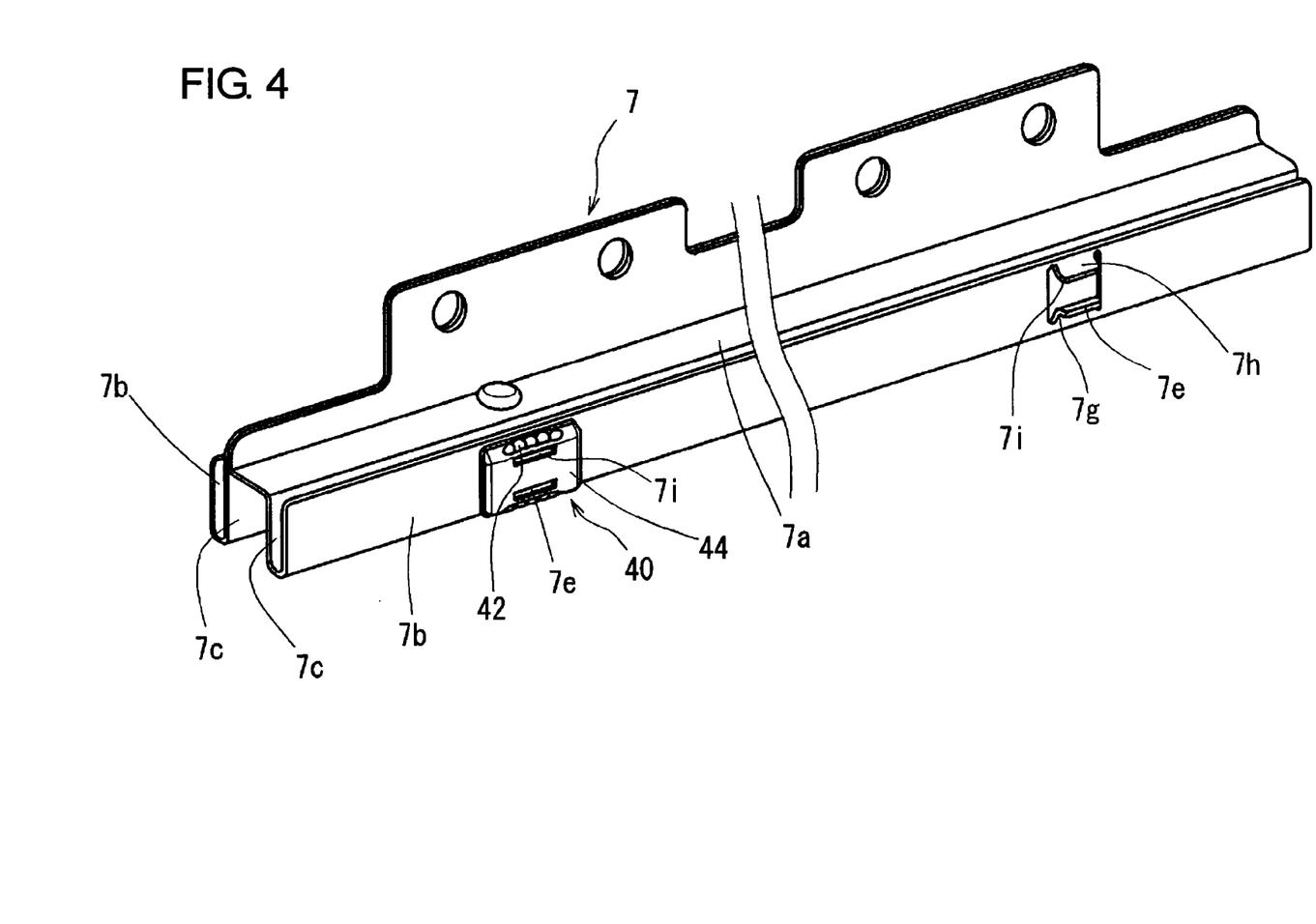
FIG. 4 is a perspective view showing a second upper rail and a rolling element circulation unit.

As shown in FIGS. 4 and 5, the second upper rail 7 is formed by bending and connecting two pieces of plate materials by welding or the like. The second upper rail 7 extends behind the first upper rail 6 in the front-rear direction of the vehicle. The second upper rail 7 has a flat base portion 7a and a pair of left and right vertical wall portions 7f which are provided at both ends of the base portion 7a to extend downward, and takes an almost inverted U-letter shape in the cross-section of the base portion 7a and a portion below the same.

The respective vertical wall portions 7f are bent outward at lower ends thereof and are turned upward from outside ends thereof, so that a pair of left and right sidewall portions 7b are formed.

As shown in FIGS. 4 and 5, each sidewall portion 7b has rolling-element rolling portions 7e, 7i that are cut and raised in an arc shape at parts of only a predetermined length in the front-rear direction of the vehicle. The rolling-element rolling portions 7e, 7i have a first rolling portion 7g (sidewall-portion outside operating surface) and a second rolling portion 7h (sidewall-portion outside operating surface) on which the rolling steel balls (rolling elements) 42 referred to later roll.

Figure 6:
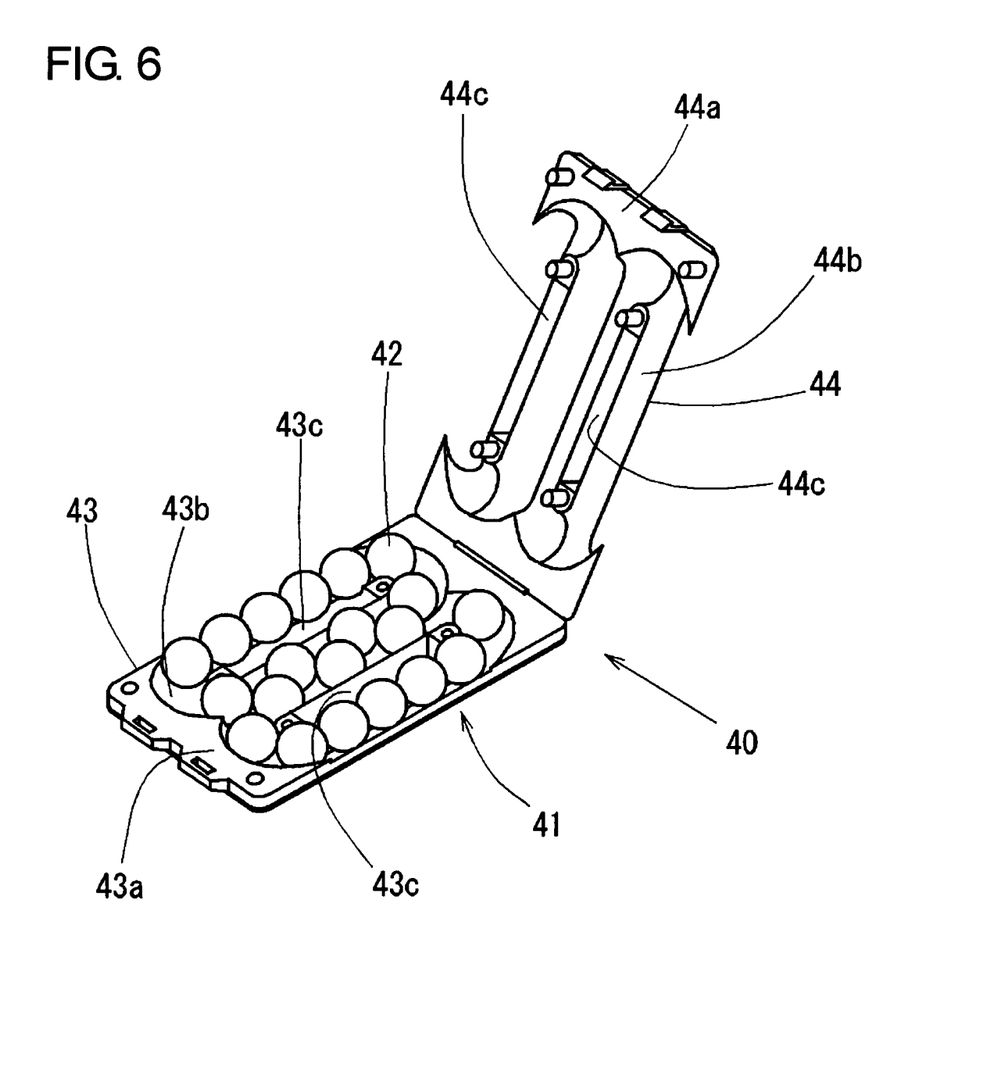
FIG. 6 is a perspective view showing the rolling element circulation unit.
Figure 7:
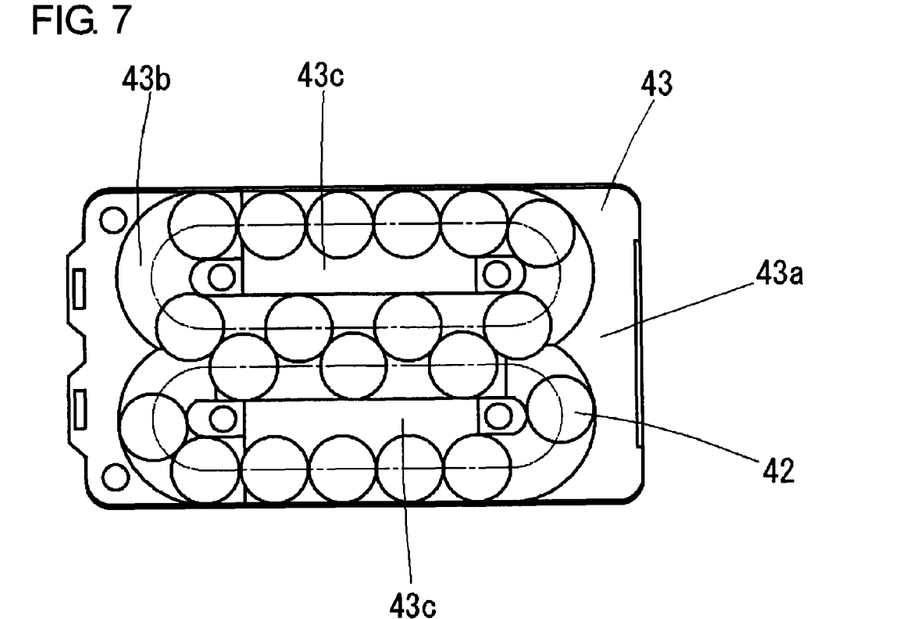
FIG. 7 is a plan view showing a first case and steel balls of the circulation unit.

As shown in FIGS. 6 and 7, the rolling element circulation unit 40 is formed by incorporating a plurality of steel balls 42 in a case member 41 which is configured in such a way that a first case 43 formed with a rolling element circulation groove 43b on a formed surface 43a and a second case 44 formed with a rolling element circulation groove 44b on a formed surface 44a are united at the formed surfaces 43a and 44a.

As shown in FIG. 4, each rolling element circulation unit 40 is attached to the second upper rail 7 by fitting mounting holes 41c that are composed of holes 43c of the first case 43 and holes 44c of the second case 44, on the rolling-element rolling portions 7e, 7i. Thus, as shown in FIG. 5, the plurality of steel balls 42 are arranged between the first rolling portion 11i of the lower rail 11 and the first rolling portion 7g of the second upper rail 7 and between the second rolling portion 11j of the lower rail 11 and the second rolling portion 7h of the second upper rail 7, so that the second upper rails 7 smoothly slide relative to the lower rails 11 in the front-rear direction X of the vehicle.

According to the present embodiment, the sidewall-portion inside operating surfaces 11g, 11h, 11i, 11j which are formed on the inside surfaces of the sidewall portions 11b of the lower rail 11 can serve as contact rolling surfaces that are common to the steel balls 14 and the steel balls 42 of the rolling element circulation units 40, so that a reduction in cost can be realized by the common use of the lower rail 11. Further, because the rolling element circulation units 40 are used on the second upper rails 7, a very long slide amount can be secured for the seat (second seat) fixed on the second upper rails 7. As is clear in comparison of the construction of the rolling member 12 with the construction of the rolling element circulation unit 40, the rolling member 12 is few in the number of the parts and also simple in construction in comparison with the rolling element circulation unit 40. Accordingly, it can be realized to reduce the cost for the seat slide device 5 by using the rolling members 12 in the seat slide mechanism for the first seat in which the required stroke amount suffices to be short.

Further, the rolling element circulation unit 40 is provided with the case member 41 in which the first and second cases, having the formed surfaces formed with the rolling element circulation grooves 43b, 44b enabling the plurality of steel balls 42 to roll and circulate therealong, are united at the formed surface 43a and the formed surface 44a. Thus, since the plurality of steel balls 42 are put between the rolling element circulation grooves 43b and 44b of the first case 43 and the second case 44 and are made as a unit, it becomes easy to perform the work that assembles the rolling element circulation units 40 to the rolling-element rolling portions 7e, 7i formed with the rolling portions 7g, 7h, so that the man-hour for assembling the seat slide device can be reduced greatly.

INDUSTRIAL APPLICABILITY

The vehicle seat slide device according to the present invention is suitable for use in a vehicle seat slide device which is provided with lower rails fixed to a floor of a vehicle and first and second upper rails respectively having first and second seats fixed thereto and movably supported on the lower rails.

The invention claimed is:

1. A seat slide device for a vehicle comprising:
   lower rails extending in a vehicle front-rear direction and adapted to be fixed to a floor of the vehicle;
   first upper rails adapted to have a first seat of the vehicle fixed thereto and assembled to the lower rails movably in the vehicle front-rear direction;
   second upper rails positioned behind the first upper rails, adapted to have a second seat of the vehicle fixed thereto, and assembled to the lower rails movably in the vehicle front-rear direction;
   rolling members that relatively move relative to the first upper rails and the lower rails with movement of the first upper rails when a first plurality of rolling elements, which are rotatably retained by retainers between sidewall-portion inside operating surfaces formed on inside surfaces of sidewall portions extending in a vehicle vertical direction of the lower rails and sidewall-portion outside operating surfaces formed on outside surfaces of sidewall portions extending in the vehicle vertical direction of the first upper rails, roll in contact on the sidewall-portion inside operating surfaces and the sidewall-portion outside operating surfaces; and
   rolling element circulation units that are attached to rolling-element rolling portions of second upper rails having sidewall-portion outside operating surfaces which are configured by cutting and raising sidewall portions extending in the vehicle vertical direction of the second upper rails at sections of the second upper rails having a predetermined length in the vehicle front-rear direction, and that incorporate a second plurality of rolling elements which roll and circulate in contact with the sidewall-portion inside operating surfaces and the sidewall-portion outside operating surfaces of the rolling-element rolling portions and through surfaces opposite of the sidewall-portion outside operating surfaces of the rolling-element rolling portions.

2. The seat slide device for the vehicle in claim 1, wherein the rolling element circulation unit is provided with a case member configured by uniting first and second cases having formed surfaces formed with circular grooves along which the second plurality of rolling elements roll and circulate, at the formed surfaces.

* * * * *